Feb. 14, 1950 D. S. McCULLOUGH 2,497,735
METALWORKING MACHINE ADAPTED TO ACT INDEPENDENTLY
OR TO AUGMENT THE FUNCTIONS OF MACHINE TOOLS
Filed Aug. 13, 1947 7 Sheets-Sheet 1

Fig. 1

INVENTOR.
DAVID S. McCULLOUGH
BY
Frederick P. Warfield
ATTORNEY

Feb. 14, 1950 D. S. McCULLOUGH 2,497,735
METALWORKING MACHINE ADAPTED TO ACT INDEPENDENTLY
OR TO AUGMENT THE FUNCTIONS OF MACHINE TOOLS
Filed Aug. 13, 1947 7 Sheets-Sheet 2

INVENTOR.
DAVID S. McCULLOUGH
BY
Frederic P. Warfield
ATTORNEY

INVENTOR.
DAVID S. McCULLOUGH
BY
ATTORNEY.

INVENTOR.
DAVID S. McCULLOUGH
BY
ATTORNEY

Patented Feb. 14, 1950

2,497,735

UNITED STATES PATENT OFFICE 2,497,735

METALWORKING MACHINE ADAPTED TO ACT INDEPENDENTLY OR TO AUGMENT THE FUNCTIONS OF MACHINE TOOLS

David S. McCullough, New York, N. Y.

Application August 13, 1947, Serial No. 768,470

6 Claims. (Cl. 90—16)

This invention relates to tools and especially to a device for milling, drilling, grinding or the like, to be used in conjunction with machine tools or similar equipment, to increase their scope, flexibility and usefulness, but which may also be used independently to perform similar operations. This tool is especially adapted for use in working upon metals but may also be used in some instances for working upon wood and other materials.

One of the objects of the invention is to provide a tool having a worm and worm wheel assembly in which backlash is reduced to a minimum and wear on bearings may be taken up.

Another object of the invention is to provide a tool with a rotating tool element in which the position of the tool element may be accurately adjusted by means of a single adjusting element and locked in adjusted position.

Another object of the invention is to provide a motor driven tool unit in which a worm and worm wheel tool drive may be used, or, alternatively, an auxiliary tool element may be driven directly from the motor, without using the worm and worm wheel, there being adjustments for a variety of speeds and, in the case of the auxiliary tool element, a coordinated angular adjustment for the tool shaft and motor shaft.

Another object of the invention is to provide a tool unit adapted to be used as a precision instrument in conjunction with another precision instrument, such as a machine tool, in which there is provided precision alignment of the tool carried by the tool unit with the movement and feeds of the machine tool such that the accuracy of the machine tool is carried on to the tool of the tool unit.

Another object of the invention is to provide a tool unit in which a tool driving shaft carries a pulley at one end, a motor carries a cooperating pulley, and the tool driving pulley may be placed at either end of its shaft, and the motor with its pulley reversed end to end so that the two pulleys may be positioned where they will offer no interference when operating the device close to obstructions on either side.

Another object of the invention is to provide a tool unit of the general nature of that above described provided with a feed table mechanism by which the tool can be moved towards and away from the work and from side to side thereof and such movements can be accurately adjusted.

Other objects and advantages of the invention will appear as the description of the invention proceeds.

The invention is illustrated in the accompanying drawings in which.

The tool unit of the invention comprises a base plate 10, (Figs. 1 and 2), and a cap plate 11 spaced apart by posts 12 which, with the plates, form a frame in which a housing 13 carrying the tool mechanism is slidably mounted so that the position of the tool may be adjusted.

In the embodiment shown there are four posts and these are preferably of circular cross-section and have reduced diameter portions 14 and 15, (Fig. 2), at the ends thereof forming shoulders 16 and 17, respectively. The portion 14 is threaded and loosely engages the threads in a tapped hole 18 provided for it in the base plate 10.

The top and bottom faces of the base plate 10 are ground flat and parallel and the shoulder 16 is ground perpendicular to the axis of the post so that when the post is screwed into the hole 18, the shoulder 16 is forced against the upper flat surface of the plate and insures the perpendicularity of the post both to the base plate and to any surface on which the base plate may be mounted regardless of the accuracy of the threads. For this reason there is preferably a large difference between the diameter of the post proper and that of the portion 14.

Similarly the cap plate 11 is ground flat adjacent the posts 12 and the shoulder 17 on each post is ground perpendicularly to the axis of the post. The hole 19 in the cap plate, however, is not tapped, but the portion 15 is long enough to pass through it to be engaged by a suitable nut 20 which draws the shoulder 17 securely against the ground face of the cap plate 11.

The housing 13 may be a hollow casting provided with four elongated bearings 20' which engage the posts 12 and permit the housing to have slidable movement within the frame. The posts and bearings are preferably made with great accuracy so as to eliminate any side motion and permit movement only in a direction parallel to the axes of the posts.

Figure 5:
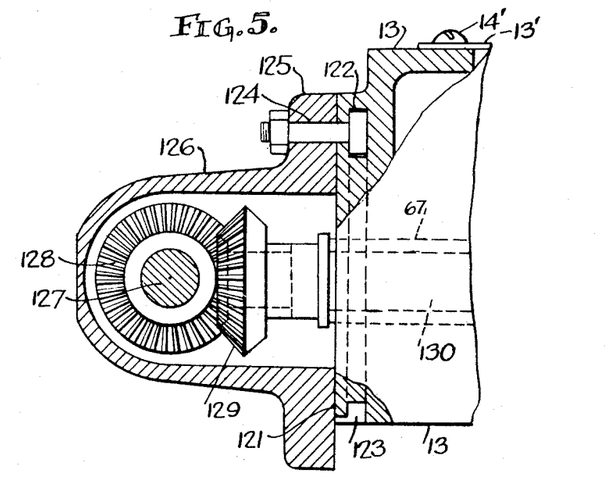
Fig. 5 is a sectional side elevational view of a portion of the housing of Fig. 4 with an additional attachment shown therewith.
Figure 6:
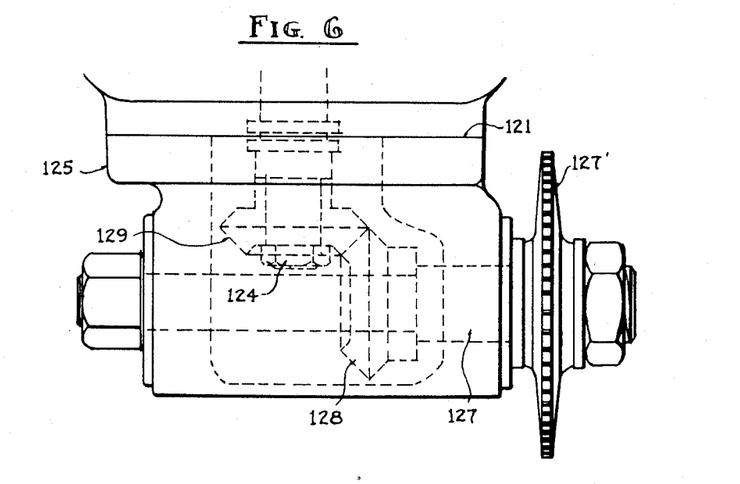
Fig. 6 is a plan view of the attachment shown in Fig. 5.
Figure 7:
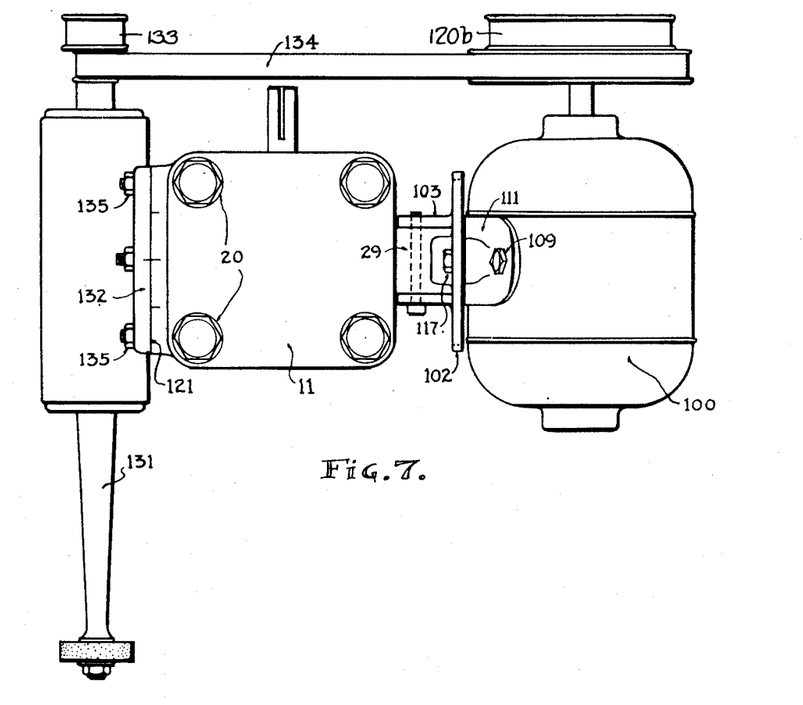
Fig. 7 is a plan view of the tool unit showing another attachment therefor.

An advantage gained from the combination of the flat parallel surfaces of plate 10, the perpendicularly of the posts 12 and the accuracy of the fit of the posts 12 and the bearings 20, is that when the device is attached to work surface or reference surface of a machine tool, alignment with the movements and feeds of the machine tool is assured and the accuracy of the machine tool is carried on to the tool carrying sleeve 67 and to the attachments, as shown in Figs. 5, 6 and 7.

The position of the housing is adjusted by means of a single screw 21 which is rotatably mounted in the cap plate 11. To this end the screw 21 is provided with a collar 22 adjacent one end and that end fits through a hole 23 in the cap plate 11 with the collar against a flat surface of the plate. A boss 24 is provided on the other side of the plate 11 and a sleeve 25 is secured against rotation on the screw 21 as by a set screw 26, and rotates against the boss 24 to hold the screw against longitudinal movement with respect to the plate. The sleeve 25 and boss 24 may be provided with suitable registering scales so that the amount of rotation of the screw 21 may be accurately observed.

A ball crank 26' may also be fixed on the end of the screw 21, as by a suitable key and keyway, and held in place by a cap nut 27, so that the screw may be rotated by turning the crank.

Thus mounted, the screw 21 extends through the frame, parallel to the posts 12, and passes through a hole 28 in a central support member 29, (Fig. 2), which supports an electric motor in a manner to be hereinafter described and which extends outwardly from the housing adjacent one end. The hole 28 is tapped to receive two sleeves or bushings 30 and 31 which are threaded into the hole. These sleeves are internally threaded to receive the screw 21 which is preferably provided with square threads. The threads on the outer surfaces of the sleeves 30 and 31 have preferably a less pitch than those on the screw 21, so that accurate longitudinal adjustments of the sleeves may be made. When properly adjusted the sleeves may be locked in position by means of set screws 32 and 33 which are threaded through tapped holes provided for them leading through the support member 29 into the hole 28 opposite their respective sleeves.

By rotating one sleeve very slightly with respect to the other it will be seen that the internal threads on one sleeve may be made to bear against one side of the threads on the screw 21 while the internal threads on the other sleeve bear against the other side of the threads on the screw. By adjusting the sleeves, therefore, it is possible to reduce play between the threads of the sleeves 30 and 31 and the screw 21 to a minimum. Any wear on the threads may also be quickly compensated for by readjusting the sleeves. Slots 34 and 35 may be provided respectively in the ends of the sleeves 30 and 31 to permit turning them with a special tool.

Figure 2:
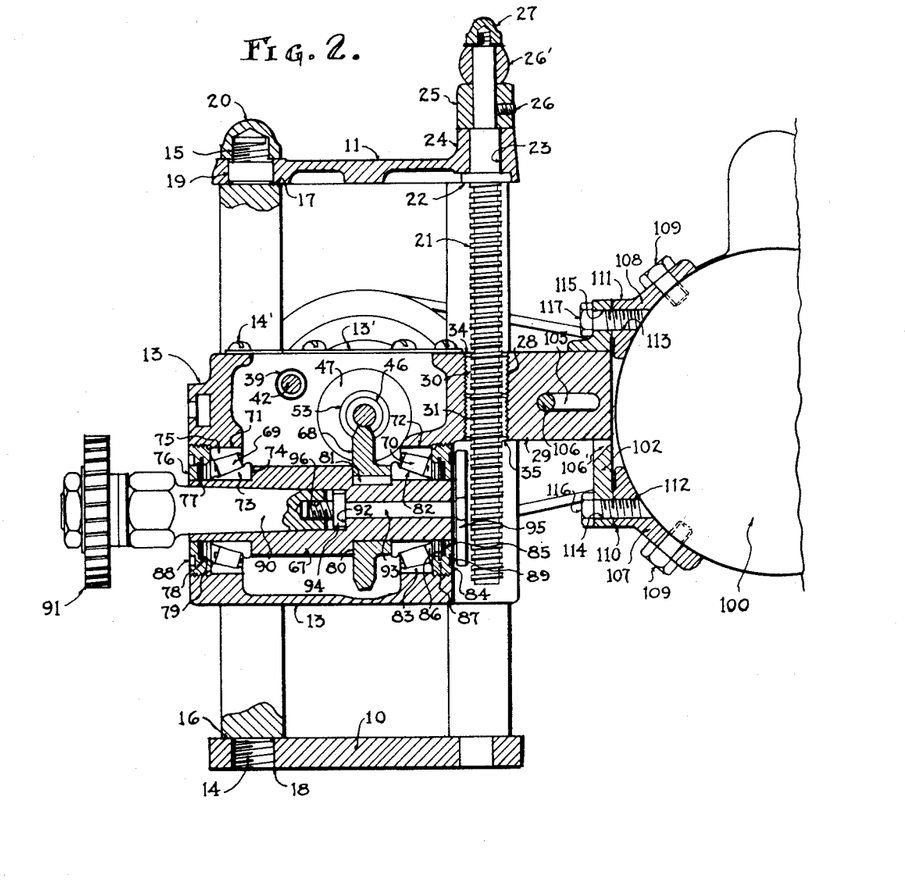
Fig. 2 is a side sectional elevational view of the machine tool unit of Fig. 1.
Figure 8:
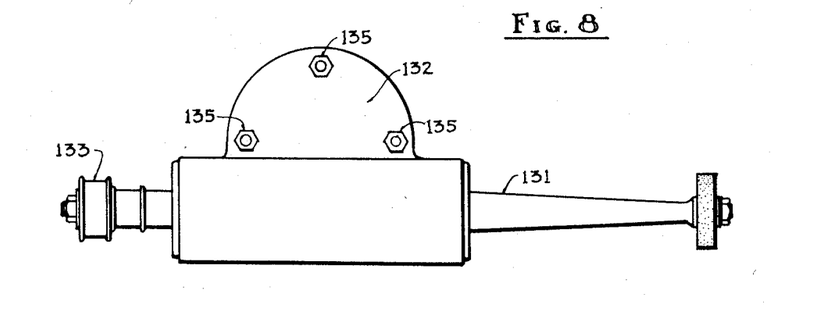
Fig. 8 is a front view of the attachment shown in Fig. 7.

As will be seen in Fig. 2, the motor is of considerably greater diameter than is the shaft housing portion of base 131, and is therefore positioned with its center and shaft above the axis of sleeve 67 to avoid interference by the under side of the motor with the surface on which base plate 10 is mounted when housing 13 is moved to its lowest position. Tool shaft 131 as shown in Fig. 8 is below the axis of sleeve 67 to avoid interference from the housing for accessibility to work to be ground or drilled.

It will be further seen that although the motor shaft and tool shaft 131, while rotating on parallel axes on different planes in respect to the axis of sleeve 67, both shafts adjust about the same axis and that therefore the driving and driven pulleys on the two shafts will remain aligned with each other regardless of the degree to which the two shafts are angularly adjusted or tilted with respect to the posts 12, so long as they are positioned parallel to each other.

Figure 3:
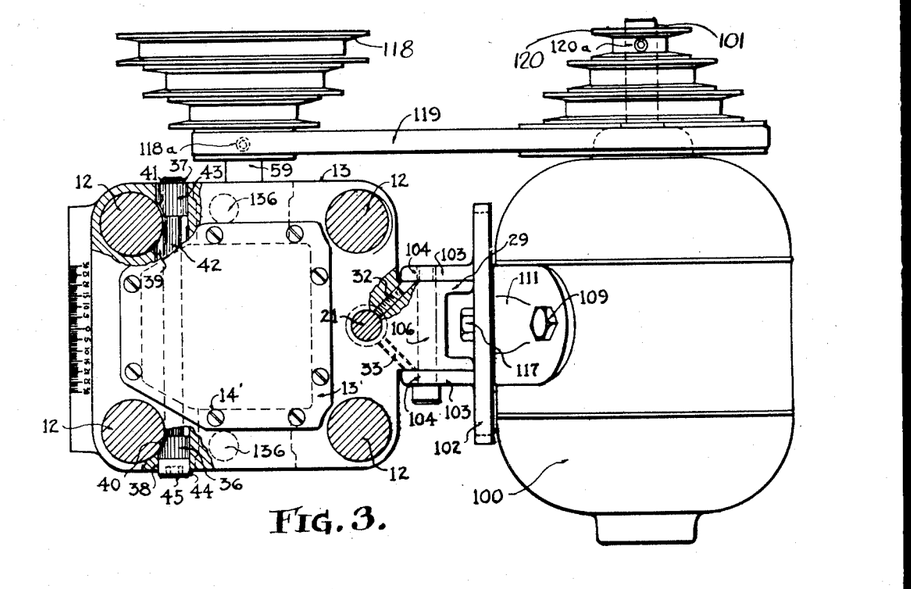
Fig. 3 is a plan view, partly in section, of the unit of Figs. 1 and 2.

The housing 13 may be locked in adjusted position, as shown in Fig. 3, by means of two locking members 36 and 37 which are caused to engage two of the posts 12. To this end holes 38 and 39 are provided in the opposite walls of the housing, aligned with each other, and close enough to two of the posts so that if the interior surfaces of the holes were continued towards each other there would be in a slight intersection with the posts.

The thickness of the walls of the housing adjacent the holes is sufficient to support the two locking or wedging members 36 and 37 which respectively fit into the holes 38 and 39 and are slidable therein. The members 36 and 37 have portions 40 and 41 of the ends cut to the configuration of the post 12 with which they come into contact when pushed sufficiently into the hole.

In order to move the members 36 and 37 in the holes, I use a single rod 42 as a rotatable control means which passes freely through a hole in the member 36 and has its other end threaded and screwed into a tapped hole 43 in the member 37. The position of the members 36 and 37 is such that the rod 42 clears the posts 12. The outer end of the rod 42 is provided with a head 44 which fits in a recess in the member 36 so as to be flush with the outer surface thereof and is provided with a socket 45 adapted to receive a wrench for turning.

A slight turn of the rod 42 in the proper direction by means of the socket 45 will cause the locking members 36 and 37 to move towards each other with the result that the portions 40 and 41 will grip their respective posts 12 to lock the housing in position. A slight movement of the rod 42 in the other direction will release the members 36 and 37 from the posts 12 and permit movement of the housing 13 by means of the screw 21. Since each of the locking members 36 and 37 are interdependent on each other for the amount of pressure each exerts on the guide posts, the action of each is therefore simultaneous and equal with the other. This simultaneous and equal action avoids the tendency to displace the position of the housing 13, which may occur when each post lock operates independently.

A further advantage gained in causing opposing locking members 36 and 37 to operate simultaneously is that the action necessary by the operation of the machine in locking in position is reduced by half as compared with independently operated post locks.

Figure 1:
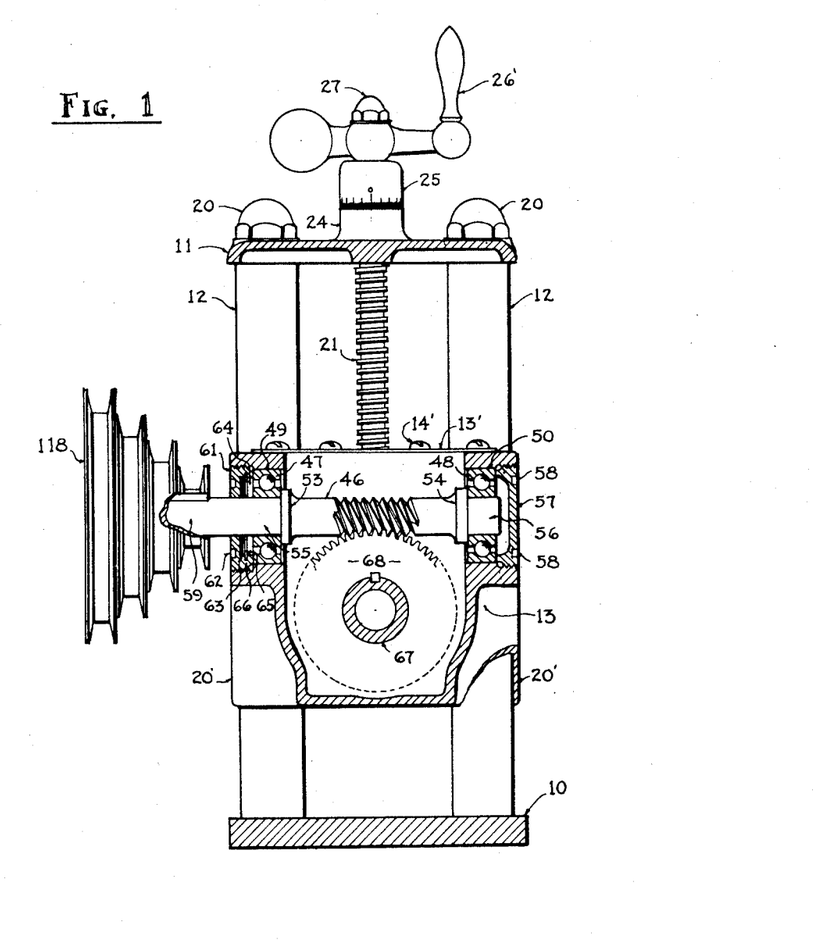
Fig. 1 is a front sectional elevational view of a machine tool unit.

A worm and worm wheel assembly is mounted in the hollow housing 13. The worm 46 is rotatably mounted in bearing sleeves 47 and 48 positioned in holes 49 and 50 in opposite walls of the housing 13. The axis of these holes is near the end of the housing 13 carrying the support member 29. The thickness of these walls is increased at these points to provide sufficient support for the bearing sleeves 47 and 48 and also for the retaining and adjusting means therefor. The shaft of the worm is provided with collars 53 and 54, as shown in Fig. 1, which bear respectively against the inner ends of the bearing sleeves 47 and 48 to prevent axial thrust of the worm, while straight cylindrical portions 55 and 56 have bearing engagement, respectively, with the inner surfaces of the bearing sleeves.

The outer end of the hole 50 is threaded to receive a bearing-adjustment disc 57, (Fig. 1), which is provided with a pair of sockets 58 so as to permit rotating with a special tool, and when threaded into the hole 50 bears against the outer end of the bearing sleeve 48. The disc 57 closes the hole 50 to prevent leakage of oil which may be contained within the housing 13.

The other end of the worm 46 is extended through the hole 49 as a splined shaft 59 upon which stepped pulley 118 may be mounted in any desirable manner, so that the worm may be belt-driven from a motor to be later described. A bearing-adjustment ring 61 surrounds the shaft and is threaded into the tapped outer end of the hole 49. The ring 61 bears against the outer end of the bearing sleeve 47. The ring 61, similarly to the disc 57, is provided with sockets 62 to receive a special tool for turning the ring.

A seal to prevent leakage of the oil from the interior of the housing 13 may be provided by means of a ring 63 of felt or other packing material which may be held in an enlarged portion 64 of the opening through the ring 61 by a spring snap ring 65 which fits into a slot 66 in the enlarged portion.

It will be seen that the bearings may not only be adjusted to reduce axial play of the worm to a minimum by turning either or both the disc 57 and ring 61, but the axial position of the worm may be changed by turning both the disc and ring to move them in the same axial direction.

Figure 4:
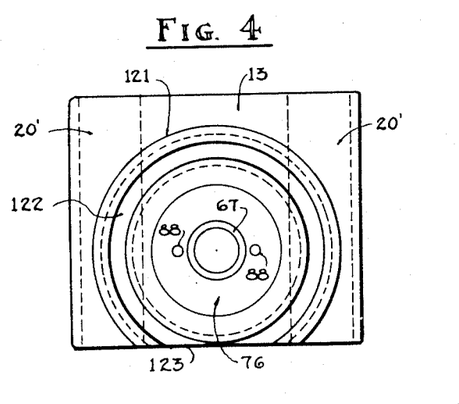
Fig. 4 is a front view of the housing which carries the tool operating mechanism.

At right angles to the worm 46 and spaced therefrom is mounted a sleeve 67 carrying a worm wheel 68 which meshes with the worm 46. This sleeve is best shown in Fig. 2. It is rotatably mounted in roller bearings 69 and 70, set in holes 71 and 72 in opposite walls of the housing 13, the hole 72 being in the same wall from which the support member 29 extends. The material of the walls is extended adjacent the holes to give sufficient support to the roller bearings which are set at an angle to withstand thrust. The inner rotating race 73 of the roller bearing 69 fits over the sleeve 67 and against a shoulder 74 formed thereon, while the outer race 75 has a sliding fit in the hole 71 and is held in place by an externally threaded adjusting ring 76 (Figs. 2 and 4), which is screwed into the tapped outer portion of the hole 71. The ring 76 carries a sealing washer 77 held in place by a spring ring 78 which is retained by an internal slot 79 into which it snaps.

The worm wheel 68 fits over the other end of the sleeve 67, which is smaller in diameter than the central portion thereof, and against a shoulder 80 formed between the two portions of different diameter. The worm wheel is keyed to the sleeve 67 by the key 81 which fits in a keyway provided for it in the sleeve and in the worm wheel.

Figure 9:
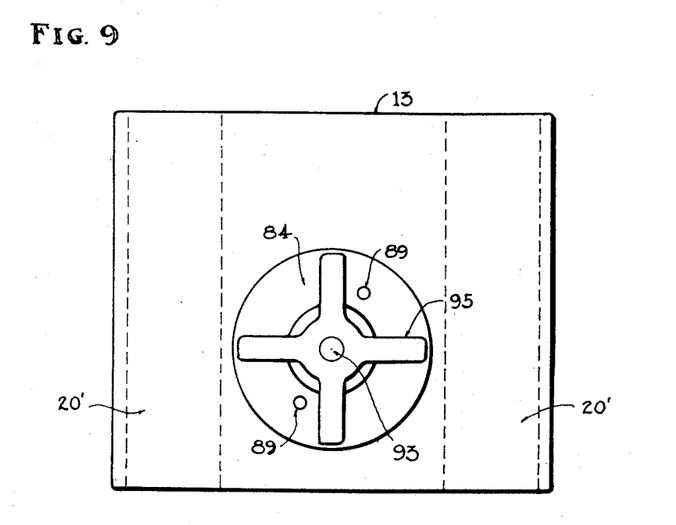
Fig. 9 is a rear elevational view of the housing showing the tool retaining member.

The inner race 82 of the roller bearing 70 fits over the sleeve and against the worm wheel 68, while the outer race 83 has a sliding fit in the hole 72 and is retained therein by an externally threaded adjusting ring 84 (Figs. 2 and 9), which is screwed into the tapped outer portion of the hole 72. The ring 84 carries a sealing washer 85 held in place by a spring ring 86 which is retained by an internal slot 86 into which it snaps.

It will be seen that by turning the adjusting rings 76 and 84 the operator cannot only take up any play in the bearings, but can also adjust the axial position of the sleeve 67 and therefore can center the worm wheel with respect to the worm. The rings 76 and 84 may be provided with suitable slots 88 and 89, respectively, for turning the rings with a special tool. The outer surfaces of the rings 76 and 84 and the ends of the sleeve are substantially flush with the front and rear faces of the housing.

The combination of the adjusting members 57, 61, 76 and 84 with a worm and worm wheel assembly in a tool unit permits adjustment to eliminate axial movement of both worm shaft and tool carrying shaft and, therefore, eliminates chatter and vibration due either to looseness of the bearings or cyclic action of a toothed milling cutter. A further advantage of the axial position adjustment obtained is to increase the power transmitting efficiency and reduce the tendency to wear by centering the worm wheel with the worm so that the mating surfaces are held in true relationship.

The end of the sleeve 67, adjacent the roller bearing 69, may be tapered internally to receive a removable spindle 90 which protrudes from the sleeve and housing and which carries a cutting tool, as, for instance, a miller 91, shown in Fig. 2. The bore of the sleeve 67 may be reduced in diameter at the other end, forming a shoulder 92, and in this reduced diameter portion is rotatably mounted a tool retaining rod 93 having a collar 94, spaced from its inner end, which bears against the shoulder 92, and a hand operated member 95, shown in the form of a cross, at the other end outside of the housing. The inner end of the rod 93 is threaded to fit into a tapped hole 96 in the spindle 90, so that by turning the hand member 95, the spindle may be drawn into the sleeve and secured therein, and it may be forced out by turning the member in the other direction. The member 95 is flat enough so as not to interfere with the screw 21 which is positioned immediately on the other side of it.

A cover plate 13' may be secured by means of screws 14' to the top of the housing to prevent the oil from escaping and to protect the worm and worm wheel within.

A driving motor 100, as shown in Figs. 2 and 3, is mounted on the support member 29 with its shaft 101 parallel to the worm 46, the arrangement being such that the spacing of the shaft from the worm may be adjusted and the motor may be tilted on an axis substantially perpendicular to a plane passing through the axis of the shaft, for a purpose to be later described.

Figure 10:
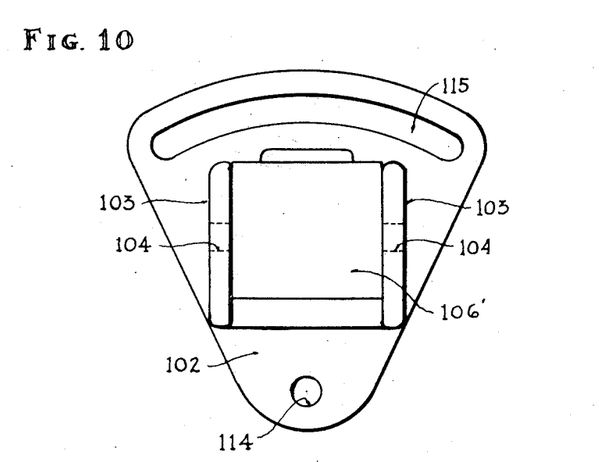
Fig. 10 is a front view of the bracket for attaching the motor for the tool unit.
Figure 11:
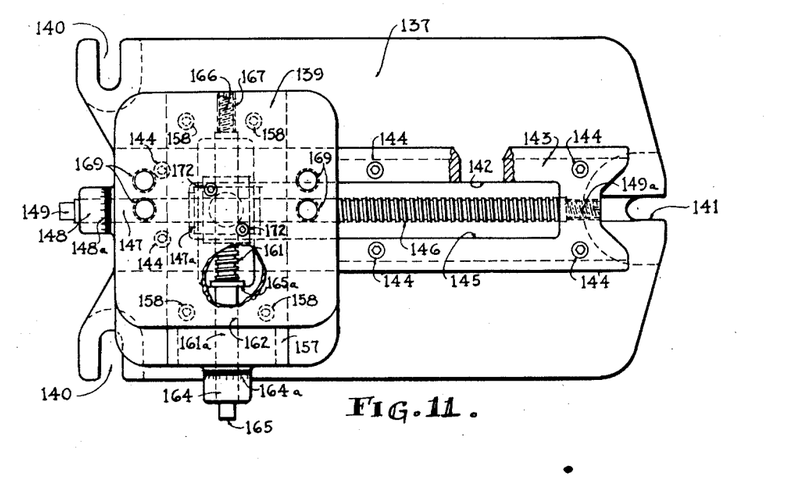
Fig. 11 is a plan view of a feed table mechanism for the unit shown in the preceding figures.

In order to support the motor I make use of a bracket 102, (Figs. 2, 3 and 10), which is generally fan-shaped and provided with a pair of spaced parallel flanges 103 extending perpendicularly to the plane of the bracket and provided with aligned holes 104. The flanges 103 are adapted to straddle the support 29 with the planes of the flanges parallel to the posts 12 and are sufficiently spaced to fit smoothly over the flat parallel sides of the support. The support is provided with a slot 105 extending through the support parallel to the plates 10 and 11 and a bolt 106 passes through this slot and through the holes 104 and may be tightened to hold the bracket 102 rigidly in position.

An opening 106' in the center of the bracket 102 is provided to receive the support 29 when the bracket 102 is swung about the bolt 106 as a pivot. The bracket may therefore be swung about the bolt 106 as a pivot or it may be moved backwards and forwards with the bolt 106 moving in the slot 105. Either movement provides a means of changing the center distance between the worm 46 and the motor 100 and thereby adjusts the tension of the belt 119.

Since the flanges 103 and the side planes of the support 29 are parallel to the posts 12, which in turn are perpendicular to the worm shaft 46, the motor shaft is maintained parallel to the worm shaft when the bracket 102 is tilted forward or back or moved forward or back with the bolt 106 moving through the slot 105.

Two motor supports 107 and 108 hold the motor 100 to the bracket 102. These supports are secured to the motor at spaced points on the side thereof as by screws 109 and are provided respectively with lugs 110 and 111 through which holes 112 and 113 extend with their axes parallel to each other and perpendicular to a plane passing through the motor shaft.

A hole 14 is provided in the narrow end of the fan-shaped bracket 102 with the axis thereof perpendicular to the plane of the bracket while the wide end of the bracket is provided with an accurate slot 115 which is curved about the hole 114 as a center. The motor support 107 is secured to the bracket 102 by a bolt 116 which passes through the holes 114 in the bracket and 112 in the motor support 107. The motor support 108 is secured to the bracket 102 by a bolt 117 which passes through the slot 115 in the bracket and the hole 113 in the support 108. The size of the bracket is such that the hole 114 in the bracket is normally aligned with the worm wheel sleeve 67.

By loosening the bolts 116 and 117 the entire motor 100 may be swung about the bolt 116 so that the motor shaft 101 may be tilted about the axis of the sleeve 67 when the bracket 102 is parallel to the posts 12. The purpose of this tilt adjustment will be described later.

The motor may be mounted with its spindle extending either to the right or the left side of the frame by removing the bolts 116 and 117 turning the motor end for end and replacing the bolts with the bolt 116 through hole 115 and threaded into motor support 108, while bolt 117 is through slot 114 threaded into support 107.

Bearing sleeves 47 and 48 have the same diameter. Holes 49 and 50 have the same diameter and threads. Worm 46 is so designed that it will operate in either direction in relation to worm wheel 68.

It is therefore evident that the device may be assembled with the extension of the worm 46 and the motor shaft 101 on either side of the device allowing the pulleys 118 and 120 to be positioned where they will offer no interference when operating the device close to obstructions on either side.

The outer end of the worm 46, as has already been described, is arranged to carry a stepped pulley 118. The shaft is splined and the pulley may be held in position by any suitable means, such as a set screw 118a, whereby the pulley may be adjusted axially of the shaft. This pulley is driven by means of a belt 119 from another stepped pulley 120 mounted on the motor shaft 101. The motor shaft may also be splined so that the pulley 120 may also be adjustably positioned axially of the shaft by any desirable means, such as a set screw 120a.

The two stepped pulleys are preferably of different diameters. That is to say, the pulley 118, for instance, may have four individual pulleys of 1½, 2, 3, and 4 inches in diameter, while the pulley 120 may have four individual pulleys of 2, 3, 4 and 6 inches in diameter. This difference in diameter of the stepped pulleys is, however, not essential since two of the same size will give 10 pulley combinations, six more than is normal for the four stepped pulleys.

The stepped pulleys are interchangeable on the two shafts and can be mounted on either shaft with either end outward. One of the individual pulleys of one stepped pulley is aligned with one of the individual pulleys of the other stepped pulley so as to obtain a desired speed ratio between the two shafts. Any difference in the length of the belt required for a certain combination of individual pulleys may then be adjusted for by moving the bolt 106 in the slot 105 and by moving the bracket 102 about the bolt 106 as a pivot. In this manner a large number of shaft speed ratios may be obtained with the equipment.

In Figs. 5 and 6 is shown an attachment by means of which the cutting tool may be rotated on an axis perpendicular to the axis of the sleeve 67. To this end the face 121 of the housing 13 (Figs. 2 and 4), surrounding the sleeve 67 is machined flat and is provided with an arcuate T slot 122 curved about the axis of the sleeve 67 as a center. The axis of the sleeve 67 is nearer the edge of the facing adjacent the base plate 10 than the other edge so that the T slot 122 runs off of this edge forming an opening 123 to permit the insert of the heads of suitable bolts 124 by means of which the attachment may be secured to the face.

This attachment, as shown in Figs. 5 and 6, comprises a plate 125 having the configuration of the face 121 of the housing 13 and provided with a cylindrical bearing member 126 transversely across the center thereof which carries a shaft 127 rotatably supported therein. This shaft is driven by means of a bevel gear 128 which meshes with another bevel gear 129 mounted on a spindle 130 secured in the sleeve 67 in the manner already explained. A cutting tool, such as a miller 127', may be mounted on the end of the shaft 127.

It will be seen that because of the arcuate slot 122 the plate 125 may be secured in a variety of rotated positions and thus the angle of the shaft 127 may be adjusted as desired. This increases the flexibility and usefulness of the tool.

A feature of the invention is the provision of means for attaching an auxiliary rotating tool, such as a grinder, to the face of the housing and driving it directly from the motor without transmitting the motion through the worm and worm wheel. An embodiment of this feature is shown in Figs. 7 and 8.

A shaft 131 is rotatably mounted crossways of a base 132 and spaced below the center thereof, which center coincides with the axis of the sleeve 67. A suitable pulley 133 is positioned on the shaft to align with the pulley 120b on the motor shaft, and a belt 134 may engage the pulleys as indicated.

Fig. 7 shows pulleys 133 and 120b as two stepped pulleys. These pulleys, however, may have each a single step or each a plurality of steps.

It will be seen that the tool shaft 131 may be set at any angle with respect to the base plate 10 by turning the auxiliary tool base 132 with respect to the housing and tightening the bolts 135. Since the motor may also be tilted about the same center, i. e., the axis of the bolt 116 which is aligned with the axis of the sleeve 67 and the center of the base 132, the direct drive from the motor may be maintained through a wide range of different angular positions of the auxiliary tool shaft 131.

As will be seen in Fig. 2, the motor is normally positioned with its center above the axis of sleeve 67 to avoid interference by the under side of the motor with the surface on which base plate 10 is mounted when housing 13 is moved to its lowest position. Tool shaft 131, as shown in Figs. 7 and 8, is below the axis of sleeve 67 for accessibility to work to be ground or drilled.

It will be further seen that, since the motor shaft and the tool shaft 131 pivot around the same axis, even though on different planes, the driving and driven pulleys on the two shafts will remain aligned with each other regardless of the degree to which the two shafts are tilted, so long as they are positioned parallel to each other.

The machine tool thus far described may be mounted upon any suitable surface for placing it in the proper position for the work to be done. Holes 136 may be provided in the base 10 on opposite sides thereof so that the base 10 may be bolted in position and thereby attached to machine tools, such as lathes, planers or millers, or to a work bench or other mounting surface. However, I may also provide a feed table mechanism upon which the base 10 may be mounted so that the whole machine tool can be moved towards and away from the work and from side to side thereof and such movements may be accurately adjusted.

This auxiliary feed table mechanism comprises three major parts: a base feed table 137, a lower carriage feed table 138 mounted on the base feed table and arranged for adjustable movement thereon in a direction lengthwise of the base feed table, and a cross-feed carriage feed table 139, mounted on the table 138 and arranged for adjustable movement at right angles to the movement of the table 138.

The base feed table 137 is an elongated platform which may conveniently be about two and a half times the length of the tool base plate 10. A pair of slots 140 extending in from oppositie sides of the base feed table at one end and a slot 141 at the center of the opposite end form convenient openings for bolting it to a suitable support. Longitudinal ridges 137a along the opposite edges of the upper surface of the platform may be provided for strengthening it.

Figure 12:
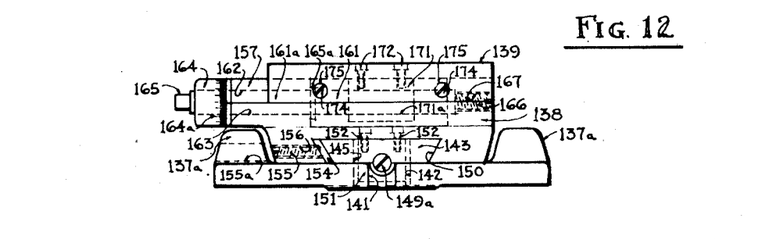
Fig. 12 is an end view of the feed table of Fig. 11.

An elongated rectangular opening 142 is provided in the table 137 extending longitudinally through the center thereof. A dove-tail member 143 is secured rigidly to the upper surface of the table 137 by screws 144. The upper surface of this member is wider than its lower surface to form the dove-tail cross-section, as indicated in Fig. 12, and the member is wider than the opening 142 in the table 137 but is considerably narrower than the table itself. Similarly, it is longer than the opening 142 but shorter than the table itself. The member 143 is also provided with an opening 145 extending longitudinally through its center, which opening is the same size and shape as the opening 142 in the table 137 and is aligned with it.

A lead screw 146 extends longitudinally within the openings 142 and 145 and is rotatably mounted in a bearing 147 which is formed partly in the table 137 and partly in the dovetail member 143, the two parts cooperating to form the complete bearing with the axis thereof coinciding with the plane of the adjacent surfaces of the two parts. A portion 146a of the lead screw is without threads to run in the bearing.

The outer end of the screw is provided with a head 148 which bears against the end surfaces of the table 137 and dove-tail member 143 and has a squared end portion 149 adapted to be engaged by a suitable wrench for turning the screw. A collar 147a on the screw bears against the inner surfaces of the openings. The head 148 preferably has a scale 148a around the circumference thereof by means of which its adjusted rotated position may be easily determined. The other end of the screw 146 is provided with a small hole into which the end of a small screw 149a is adjustably positioned as a bearing. The screw 149a is threaded into a hole formed half in the base feed table 137 and half in the dove-tail member 143.

Upon the base table 137 is positioned the lower carriage feed table 138. This member comprises a plate about the size of the base 10 of the machine tool and this plate has a dove-tail groove 150 in the lower surface thereof adapted to receive the dove-tail member 143 attached to the base feed table 137, so that the table 138 may slide longitudinally on the surface of the table 137 but is held thereupon by the cooperation of the dove-tail member of the latter and the groove of the former.

A block 151 is attached to the center of the under surface of the lower carriage feed table 138 by screws 152 and has a tapped hole 153 extending longitudinally through it and the screw 146 is threaded in this hole. It will be seen that by turning the screw the block 151 will move within the openings 145 and 142 in the dovetail member and table 138, respectively, and carry the table 138 along the surface of the base feed table 137 in the direction of the axis of the screw.

In order to eliminate play in the dove-tail connection, I make the dove-tail groove 150 a little wider than the dove-tail member 143 and provide a long narrow shim 154 within the groove at the side of the dove-tail member, as shown in Fig. 12. Two screws 155 are threaded into tapped holes 156 in the side of the feed table 138 and may be adjusted to press the shim against the side of the dove-tail member. Holes 155a in one of the side ridges 137a give access to the screws.

Figure 13:
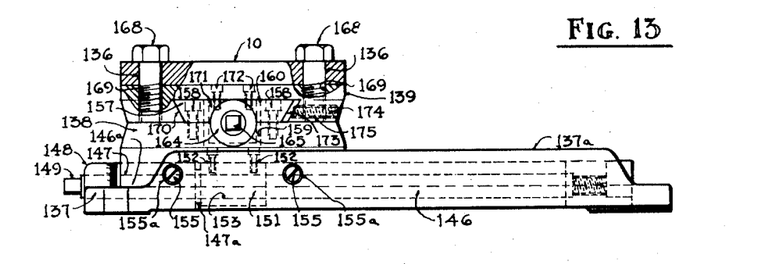
Fig. 13 is a side elevational view of the feed table.

The lower carriage feed table 138 is also provided with a dove-tail member 157 attached to its upper surface by screws 158, this member extending at right angles to the dove-tail groove in the lower surface of the feed table. (See Fig. 13.) The dove-tail member 157 and feed table 138 have aligned central openings 159 and 160, respectively, through which a lead screw 161 extends in the plane of the adjacent surfaces of the member and table, cooperating bearings 162 and 163 being provided respectively in the member and table for rotatably supporting the screw in the same manner as the screw 146 is supported, a portion 161a being smooth to run in the bearing. The outer end of the lead screw 161 is provided with a head 164 which bears against the ends of the table 138 and the dove-tail member 157 and carries a scale 164a by means of which its adjusted rotated position may be easily determined. The head has a squared end portion 165 adapted to receive a wrench for turning. A collar 165a on the screw bears against the inner surfaces of the openings 159 and 160.

The inner end of the lead screw 161 may be provided with a hole into which is adjustably positioned the end of a small screw 166 to form a bearing therefor. The small screw 166 is threaded into a tapped hole 167 formed half in the upper surface of the feed table 138 and half in the lower surface of the dove-tail member 157.

The cross-feed carriage feed table 139 is mounted upon the lower carriage feed table 138. The table 139 is a thick plate about the size of the base 10 of the machine tool which is adapted to be secured to the upper surface of the table by means of screws 168 which pass through the holes 136 in the base and are threaded into tapped holes 169 in the table 139. The table is provided with a dove-tail groove 170 adapted to fit over the dove-tail member 157, so that the cross-feed carriage feed table is held down upon the lower carriage feed table 138 but is free to slide thereon along the axis of the dove-tail member 157. A block 171 is attached to the lower surface of the cross-feed carriage feed table 139, as by screws 172, and this block is provided with a tapped hole 171a to engage the threads of the lead screw 161 which is threaded through the hole. The block fits into the openings 159 and 160 in the dove-tail member 137 and the table 138, respectively, and moves in those openings along the axis of the screw 161 when the screw is turned.

As in the previous case, the groove may be made somewhat wider than the dove-tail member and a shim 173 provided in the space thus left which may be pressed against the side of the dove-tail member to maintain a close fit without play by screws 174 threaded through holes 175 in the side of the table 139.

With the parts assembled as described above, it will be seen that rotation of the lead screw 146 will cause the whole assembly above the base feed table 137 to move in one direction or the other, depending on the direction of the rotation of the screw, along the axis of the screw. Rotation of the lead screw 161 will cause the cross-feed carriage table 139, together with the machine tool which is supported upon it, to move in one direction or the other, depending on the direction of rotation of the screw, along the axis of the screw which is in a direction at right angles to the first mentioned movement.

Play in the dove-tail joints may be eliminated by tightening the screws 155 and 174 and wear may thus be compensated for.

The threads of the screws 146 and 161 preferably have the same shape, diameter, and pitch and the dimensions are made such that the cross-feed carriage feed table 139 will also fit upon the base feed table 137 with the groove 170 engaging the dove-tail member 143. Therefore, if movement of the entire machine tool in only one direction is required, and it is desired to bring the tool closer to the surface on which it is mounted, the lower carriage feed table 138 may be removed and the cross-feed carriage feed table 139 mounted directly on the base feed table. This reduces the height of the machine in respect of the surface on which the feed table is mounted.

From the above description it is evident that I have provided a machine tool having a motor driven rotating tool element which may be moved with respect to the frame of the tool by rotation of a single ball crank and locked in the desired operating position. By means of the auxiliary base plate the entire frame may be shifted towards and away from the work. All the parts may be adjusted to eliminate backlash or reduce it to a minimum and thus prevent chattering of the tool when in use and permitting extreme accuracy in the control of the tool element. The adjustment of the spacing between the motor shaft and worm permits great flexibility of speeds for the tool element by the use of different pulley combinations. Also, additional functions are provided by the auxiliary tool which can be driven directly from the motor and can be placed at various angles with respect to the base plate.

From the above it is also evident that I have provided a machine tool of marked flexibility and accessibility to work to be machined, provided with controlled, accurate movement in its slidable parts, angular adjustment of tool carrying shafts and motors, and ability to position the machine close to obstructions without interference with its driving mechanism.

It is apparent that the various features are interrelated in that the failure of any part to provide precision and freedom from chatter would reduce the advantages gained by other features, and that the flexibility and accessibility provided by each feature increases the values of each of the others and the sum total value of the machine.

The speed of the tool may be quickly adjusted by the arrangement of different sized stepped pulleys adjustable axially on the driving and driver shafts, thus permitting the attainment of the proper tool speed.

Since certain changes may be made in the above construction and different embodiments of the invention could be made without departing from the scope thereof, it is intended that all matter contained in the above description or shown in the accompanying drawings shall be interpreted as illustrative and not in a limiting sense.

It is also to be understood that the following claims are intended to cover all of the generic and specific features of the invention herein described, and all statements of the scope of the invention which as a matter of language might be said to fall therebetween.

Having described my invention, what I claim as new and desire to secure by Letters Patent is:

1. A tool unit having a frame with a plurality of guide posts, a housing mounted for slideable movement on the frame whose movement is limited to a pre-determined path by the posts, screw means for moving and positioning the head along that path, a sleeve rotatably mounted in the housing which has one end adapted for receiving a tool which end is exposed on one side of the housing; a tool-carrying attachment including when attached to the tool-receiving side of the housing a tool shaft perpendicular to the sleeve as well as means for supporting the tool shaft axially nearer one end of the frame than is the sleeve for angular adjustment in respect to the frame but adjusted about the axis of the sleeve, belt means external of the housing for driving the tool shaft, motor means attached to the side of the housing opposite from the attachment, and means for supporting the motor for adjusted positions about the axis of the sleeve, the motor being so positioned that its shaft is farther removed from one end of the frame than is both the tool shaft and the sleeve, whereby the tool shaft may be positioned close to work without interference from the motor or the housing and the motor shaft adjusted to varying positions parallel to the tool shaft without causing misalignment of the belt means.

2. A tool unit having a frame with a plurality of parallel round guide posts, a tool-carrying head mounted for slideable movement on the frame whose movement is limited to a pre-determined path by the posts, screw means for moving and positioning the head along that path, motor means attached to the head for driving the head, and means for locking the head in an adjusted position with respect to the frame comprising in combination wedging members carried by the head each adjacent a different guide post, and rotatable control means for reciprocating each wedging member simultaneously against its contacting guide post with substantially equal pressure.

3. A tool unit as described in claim 1, in which the control means for reciprocating the wedging members is a screw threadedly engaging one of the wedging members while rotatably supported in another.

4. A tool unit having a frame with a plurality of guide posts, a tool-carrying head mounted for slideable movement on the frame whose movement is limited to a pre-determined path by the posts, screw means for moving and positioning the head along that path, a tool shaft rotatably mounted on the head, belt means for driving the shaft, and motor means attached to the head in which the means for attaching the motor includes a support with parallel surfaces perpendicular to a slot contained in the support, a motor bracket with faces fitted over the parallel surfaces and slideable thereon, a bolt passing through the bracket faces and the slot parallel to the motor shaft, means for tightening the faces upon the surfaces of the support, and means for adjusting the motor shaft in angular relation to the guide posts, whereby the center distance of the motor shaft and the driven shaft may be varied by sliding the bracket selectively toward and from the driven shaft along the support and by moving the motor radially around the bolt while maintaining the motor shaft in adjusted angular relation to the guide posts.

5. A tool unit having a frame with a plurality of guide posts, a tool-carrying head mounted for slideable movement on the frame whose movement is limited to a pre-determined path by the posts and having a uniform diameter threaded bore, motor means for driving the tool head attached to the head, a screw for moving and positioning the head along the guide posts, a pair of aligned sleeves in said bore surrounding the screw whose inner surfaces are threaded to receive the screw and whose outer surfaces are threaded a different pitch selected to engage the threaded bore, and means for adjustably locking at least one sleeve to the head, whereby (1) end play of the screw in the head is controlled and (2) wear which is compensatable by further adjustment of one sleeve is confined to the sleeves and the screw.

6. A tool unit having a frame with a plurality of guide posts, a tool-carrying head mounted for slideable movement on the frame whose movement is limited to a pre-determined path by the posts, motor means for driving attached to the head, a tool carried on one side of the head, means for locking the head in an adjusted position by wedging action against the posts adjacent to the tool side of the head, and lead screw means for moving the head along the guide posts rotatably mounted in the frame against end play as well as located parallel to and in approximately the same plane as the posts on the side of the head opposite the tool, a pair of aligned sleeves with which the screw has threaded engagement attached to the head, and means to adjust the longitudinal position of one of the sleeves in respect to the other for minimizing end play of the screw in relation to the head, whereby the screw cooperates with the locking means to hold the head accurately in position on the posts and to discourage rocking movement of the head about the locking means.

DAVID S. McCULLOUGH.

REFERENCES CITED

The following references are of record in the file of this patent:

UNITED STATES PATENTS

| Number | Name | Date |
|---|---|---|
| 253,266 | Darling | Feb. 7, 1882 |
| 421,517 | Richards | Feb. 18, 1890 |
| 477,831 | Beidler | June 28, 1892 |
| 957,978 | Meyers | May 17, 1910 |
| 997,919 | Jones | July 11, 1911 |
| 1,022,756 | Rice | Apr. 9, 1912 |
| 1,057,005 | Miles | Mar. 25, 1913 |
| 1,131,340 | Delaney | Mar. 9, 1915 |
| 1,146,995 | Bossert | July 20, 1915 |
| 1,434,130 | Lloyd | Oct. 31, 1922 |
| 1,490,411 | Baker | Apr. 15, 1924 |
| 1,684,665 | Edwards | Sept. 18, 1928 |
| 1,975,947 | Isler et al. | Oct. 9, 1934 |
| 2,041,578 | Tautz | May 19, 1936 |
| 2,074,844 | Hill | Mar. 23, 1937 |
| 2,215,369 | Gabriel | Sept. 17, 1940 |
| 2,228,664 | Knouse et al. | Jan. 14, 1941 |
| 2,341,968 | West | Feb. 15, 1944 |
| 2,352,227 | Sarossy | June 27, 1944 |
| 2,453,315 | Harbison | Nov. 9, 1948 |

FOREIGN PATENTS

| Number | Country | Date |
|---|---|---|
| 81,126 | France | May 27, 1868 |